Patented June 30, 1942

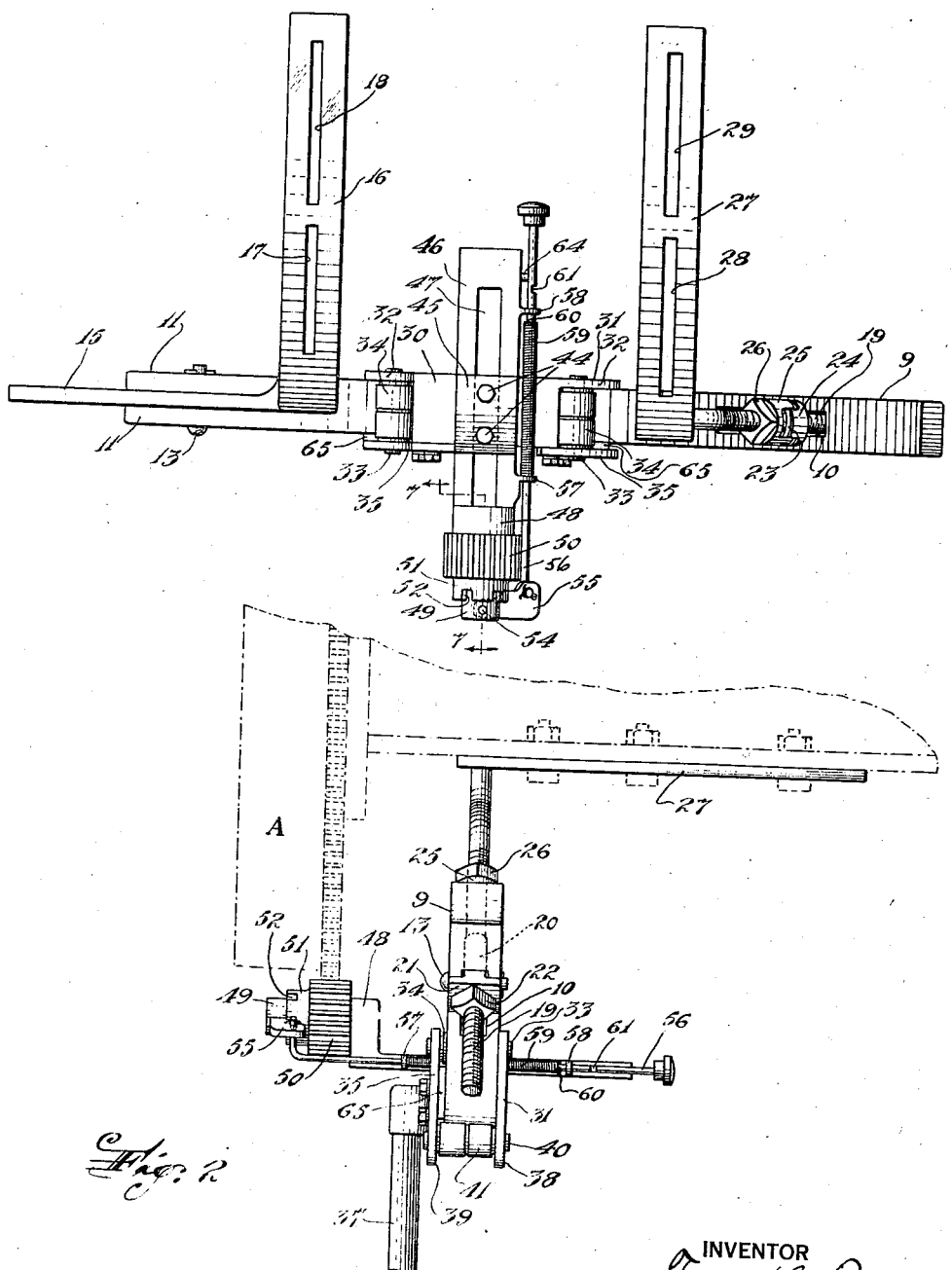

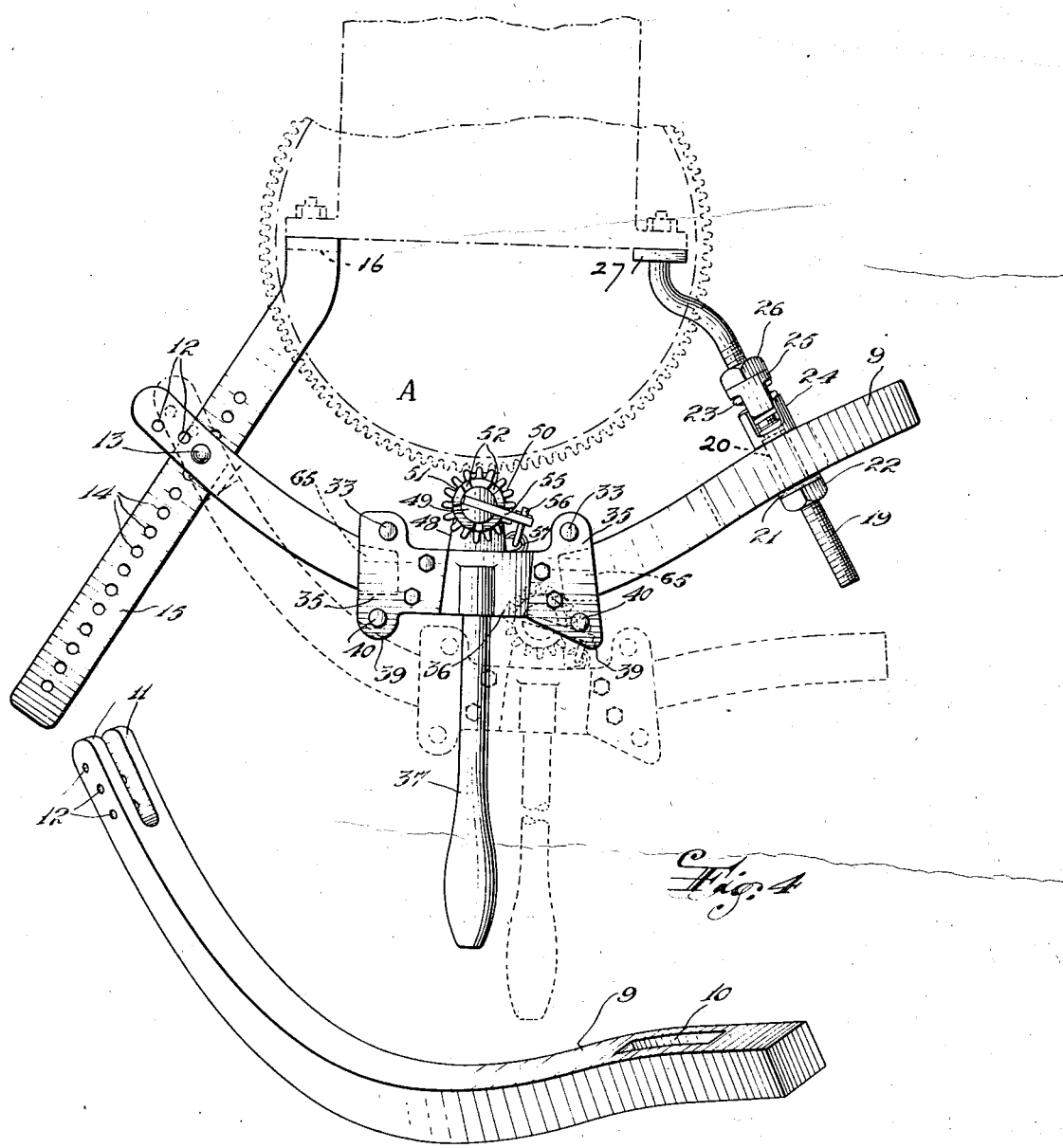

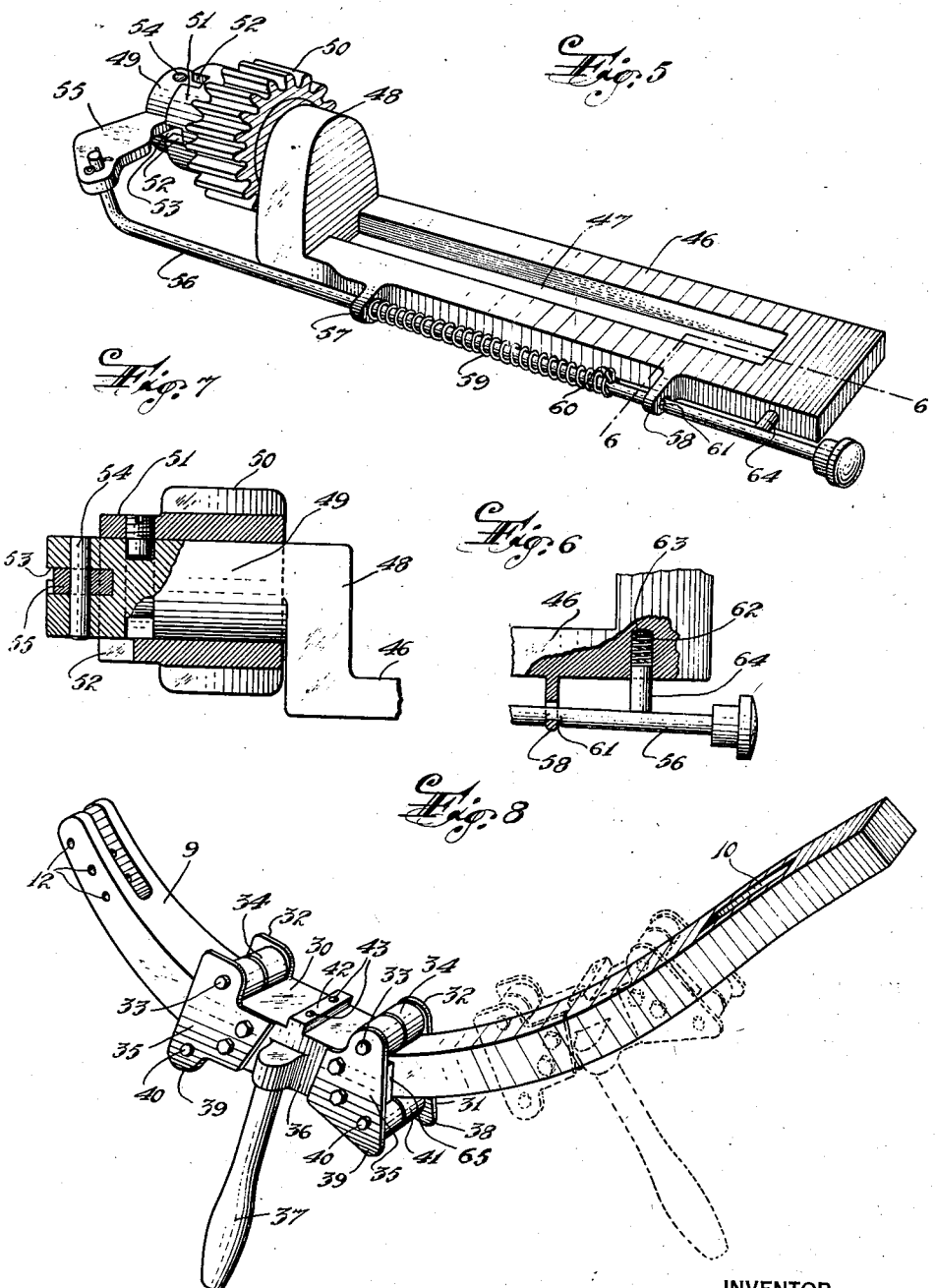

2,288,228

UNITED STATES PATENT OFFICE 2,288,228

DEVICE FOR REPAIRING AUTOMOTIVE ENGINES

Tony De Biasse, Madison, N. J.

Application February 8, 1941, Serial No. 378,107

15 Claims. (Cl. 81—57)

This invention relates to improvements in devices for repairing automotive engines; and more particularly to the provision of means to facilitate access to various parts inside of an engine for repair and adjustment purposes.

In the repair of automotive engines, when it is necessary to make repairs of parts associated with the crank shaft and flywheel of the engine, such as crank shaft bearings, cam shaft, pistons, and connecting rods, etc., access to such parts is attained by removing the oil pan from the bottom of the crank case. However, the mere removing of the oil pan from the bottom of the crank case is generally insufficient as a particular part desired to be repaired may be so positioned that it cannot be removed or conveniently repaired. It is then necessary to turn the flywheel to a certain angle to bring the desired parts into a conveniently accessible position.

It is the present day practice in the manufacture of automobiles to eliminate the hand starting crank, the starting of the engine being accomplished solely by the self-starter. Under such conditions the angular adjustment of a flywheel by hand has been heretofore extremely inconvenient and difficult, requiring considerable force, a great deal of time and often resulting in serious injury to the workman. Also, the services of two or more men has been required to manually turn the flywheel to the proper angle to enable convenient access to desired parts. The rotating of the flywheel by means of the self-starter obviously is impractical as there is no assurance that the flywheel will come to rest at a point to bring the desired parts into proper position to enable convenient access thereto. In other words, when the self-starter is used, the repair man never knows where the flywheel will come to rest.

Repairs of the type above mentioned are usually made by an automobile mechanic with the assistance of a helper. Where a hand crank can be used the helper rotates the flywheel and crank shaft by means of the hand crank to bring the parts into the desired position. But as stated before, the use of a hand crank for an automobile has practically been eliminated and the flywheel is rotated solely by the self-starter or it may be rotated step-by-step by using a large screw driver or similar implement which often results in injury to the teeth of the flywheel and to the mechanic.

It is, therefore, an object of this invention to provide a device which can be readily and adjustably attached to the underside of a crank case for conveniently and safely angularly adjusting the flywheel in order to position the parts to be repaired so that they can be conveniently and readily removed.

A further object is the provision of a device for facilitating the repair of automotive engine parts, said device having means enabling it to be adjustably attached to the underside of a crank case and having means for engaging the flywheel of an engine to angularly adjust the flywheel to desired positions.

A further object of the invention is the provision of a device for facilitating the repair of automotive engine parts, which device is provided with means to enable it to be adjustably attached to engines of various sizes and the device being provided with means for engaging and angularly adjusting the flywheel of an engine in order to position parts of the engine so that they are conveniently accessible for repair purposes.

A further object is the provision of a device for repairing automotive engines, said device having means for engaging and angularly adjusting the flywheel of the engine.

These and other advantageous objects, which will later appear, are accomplished by the simple and practical construction and arrangement of parts hereinafter described and exhibited in the accompanying drawings, forming part hereof, and in which:

Fig. 1 is a plan view of an automotive engine repair device embodying the invention, Fig. 2 is a side elevational view of the device, Fig. 3 is a front elevational view of the device, Fig. 4 is a perspective view of a guide rail used in the device, Fig. 5 is a perspective view of a bracket carrying a pinion adapted to engage a flywheel, Fig. 6 is a sectional view taken on line 6—6 of Fig. 5, Fig. 7 is a sectional view taken on line 7—7 of Fig. 1, and Fig. 8 is a perspective view of the guide rail having a carriage mounted thereon.

Referring to the drawings, the device is shown to comprise an arcuate guide rail 9 (see Figs. 4 and 8), having a slot 10 at one end and forks 11 at the other end, the forks 11 being provided with holes 12 to receive bolt 13 which also passes through holes 14 of a bar 15, for adjustably positioning bar 15, which has an upper angularly directed portion 16 provided with slots 17 and 18 to enable portion 16 to be adjustably attached by bolts to the underside of a crank case.

Passing through slot 10 and guide rail 9 is a bolt 19 which is encircled by a sleeve 20 having a flange 21 at the lower end thereof engaging the underside of rail 9. A nut 22 threadedly engages the bolt 19 and bears against the flange 21. A coil spring 23 encircles the bolt 19 and is positioned in a lower cup 24 and an upper cup 25, said cups having dove-tailed portions to enable them to slide toward or away from each other. The cups are positioned above the guide rail 9 and a nut 26 threadedly engages the bolt 19 and bears against the upper cup 25. Attached to the upper end of bolt 19 is a bar 27 which is provided with a pair of slots 28 and 29 to enable the bar to be attached by means of bolts to the underside of the crank case (shown in dotted lines).

Slidably mounted on the guide rail 9 is a carriage comprising a plate 30 (see Fig. 8) which has a downturned portion 31 embracing one side of the guide rail, said plate 31 being provided at each end thereof with upstanding ears 32 which receive pins 33 upon which are rotatably mounted roller bearings 34, the pins 33 being supported on the other side of the rail by plates 35 which are attached to a plate 36 carrying a downwardly extending handle 37 by means of which the carriage may be moved manually along the guide rail 9. The plate 31 has also downwardly extending ears 38 and the plates 35 have similar ears 39 which support pins 40 upon which are rotatably mounted roller bearings 41 engaging the underside of rail 9. The plate 30 intermediate its length is provided with an upstanding rib 42 provided with a pair of threaded holes 43 which receive bolts 44 passing through apertures in clamping plate 45 which is adapted to engage and clamp a bar 46 in longitudinally adjusted positions. Bar 46 is provided with a longitudinal slot 47 having a width sufficient to accommodate the rib 42 so that the rib acts as a guide for the bar 46. Positioned between plates 35 and the guide rail 9 are small blocks of fibrous material 65 which prevent the carriage from binding on the guide rail when it is moved along the guide rail.

Projecting upwardly from one end of the bar 46 is a lug 48 which supports a stub shaft 49 (see Fig. 7) upon which is rotatably mounted a pinion 50 having integral therewith a collar 51 provided with a plurality of spaced notches 52. The end of the stub shaft 49 is diametrically slotted at 53 and pivotally mounted in the slot, by means of a pin 54, is an arm 55 which is adapted to enter into one of the notches 52 to prevent rotation of the collar 51 and pinion 50 independently of the stub shaft 49. Attached to one end of the arm 55 is a rod 56 which is slidably supported in projections 57 and 58 on the bar 46. Encircling the rod 56 between the projections 57 and 58 and bearing against projections 57 is a coiled compression spring 59 having one end thereof engaging a pin 60 fixed to the rod 56.

The rod 56 is provided with a notch 61 into which the projection 58 is moved when the rod is forced in the direction of the pinion 50, that is to the left, see Fig. 5. When in this position, the arm 55 will not engage the notches 52 and the pinion 50 will be free to rotate independently of the stub shaft 49. When the rod 56 is disengaged from the projection 58 and allowed to move to the right by the action of the compression spring, the arm 55 will engage one of the notches 52 to prevent movement of the pinion 50 independently of the stub shaft 49. In order to insure proper engagement of the projection 58 in the notch 61, the bar 46 is provided with a recess 62 in which is positioned a coil spring 63 constantly urging a small pin 64 outwardly and against the rod 56 (see Fig. 6).

In operation, when it is desired to repair certain parts of the engine assembly, the device is attached to the underside of the crank case of an engine by means of the bars 16 and 27 (see Figs. 1 and 3). In order to accommodate engines of different sizes, the relative position of the guide rail 9 with respect to the flywheel of the engine can be controlled by adjusting the bar 15 by means of holes 14 and bolt 13 and also by adjusting the threaded bolt 19 which passes through slot 10 in rail 9. These adjustments are made in order to bring the pinion 50 to the proper height so that it will engage teeth on the flywheel A of an engine. The position of the pinion can also be adjusted horizontally to insure proper engagement between the teeth of the flywheel and the pinion by loosening the bolts 44 and sliding the bar 46 over the rib 42 until the pinion directly engages the teeth of the flywheel, after which the bolts 44 are tightened to hold the bar 46 in adjusted position. Now, in order to angularly adjust the flywheel, the rod 56 is allowed to move to the right (see Fig. 5) to cause the arm 55 to engage a notch 52 and thus prevent independent rotation of the pinion relative to the stub shaft 49. Angular adjustment of the flywheel is made by grasping the handle 37 and moving the carriage along the guide rail 9 which movement causes the pinion 50 to rotate the flywheel to angularly adjust the latter to the desired position enabling the convenient access to the parts to be repaired. During the repairing of certain parts, it is sometimes necessary to operate the motor by means of the self-starter. Under such circumstances, the rod 56 is moved to the left, see Fig. 5, to disengage the arm 55 from the notches 52 so that the pinion 50 can rotate freely on the stub shaft 49.

From the above description it will be seen that there has been provided a simple and effective device for conveniently adjusting the position of a flywheel angularly to enable convenient access to various parts of an engine, which may require adjustment or repair. The device can be installed and operated by a single workman and no great force is required to rotate a flywheel; nor is there danger of the workman injuring his hands as has been the case heretofore, when angular adjustments of the flywheel required the use of great force and tools to make such adjustments.

While I have described the device as being mounted on the underside of the crank case, which is the manner in which it would generally be mounted, it is understood that other means of support may be provided without departing from the spirit of the invention.

The foregoing disclosure is to be regarded as descriptive and illustrative only, and not as restrictive or limitative of the invention of which obviously embodiments may be constructed including many modifications, without departing from the spirit and scope of the invention herein set forth and denoted in the appended claims.

Having thus described my invention, what I claim as new and desire to secure by Letters Patent is:

1. In a device for repairing automotive engines, an arcuate guide rail, a carriage slidably mounted on said guide rail, a pinion carried by said carriage and adapted to engage the teeth of a flywheel of an engine, means to support said device from the underside of the crank case of an engine, means to prevent rotation of the pinion, and means to move the carriage along the guide rail.

2. In a device for repairing automotive engines, an arcuate guide rail, a carriage movably mounted on said guide rail, a bar mounted on said carriage and adjustable longitudinally at right angles to the guide rail, a stub shaft carried by said bar, a pinion rotatably mounted on said shaft, means to prevent rotation of the pinion relative to the stub shaft, said pinion being adapted to engage the teeth of a flywheel of an automotive engine, and means to move the carriage along the guide rail.

3. In a device for repairing automotive engines, an arcuate guide rail, a carriage movably mounted on said guide rail, means to support said guide rail, a pinion carried by said carriage, means to normally prevent rotation of said pinion, means to adjust the position of the pinion to cause the pinion to properly engage the teeth of a flywheel of an engine, and means to move the carriage along the guide rail.

4. In a device for repairing automotive engines, an arcuate guide rail, a carriage slidably mounted on the guide rail, a rib projecting from one side of the carriage, a bar slidably guided by said rib, a stub shaft carried by said bar, a pinion rotatably mounted on said stub shaft, means to normally prevent rotation of said pinion, and means to adjust the position of the guide rail and pinion to cause the pinion to engage the teeth of a flywheel of an automotive engine.

5. In a device for repairing automotive engines, an arcuate guide rail having a slot at one end and forks at the other end, a bar adjustably positioned between said forks and having means for attaching the bar to the underside of a crank case, a threaded bolt passing through the slot in said guide rail, a bar attached to said threaded bolt and adapted to be attached to the underside of said crank case, means to adjust the position of said threaded bolt, a carriage slidably mounted on the guide rail, a pinion supported by the carriage and adapted to engage the teeth of a flywheel of an engine, means to prevent rotation of the pinion, and means to move the carriage along the guide rail.

6. In a device for repairing automotive engines, an arcuate guide rail, a carriage mounted on said guide rail, roller bearings carried by said carriage to facilitate the movement of the carriage along the guide rail, means to move the carriage along the guide rail, a pinion supported by the carriage, means to prevent rotation of the pinion, and means to adjustably support said guide rail and cause the pinion to engage the teeth of a flywheel of an automotive engine.

7. In a device for repairing automotive engines, an arcuate guide rail, a carriage slidably mounted along said guide rail, a rib projecting from said carriage and at right angles to said guide rail, a bar at right angles to the guide rail and guided by said rib, said bar having an upstanding lug, a stub shaft projecting from said lug, a pinion rotatably mounted on the stub shaft, means to prevent rotation of the pinion, and means to adjustably support the guide rail and cause the pinion to engage the teeth of a flywheel of an automotive engine.

8. In a device for repairing automotive engines, an arcuate guide rail, a carriage slidably mounted along said guide rail, a rib projecting from said carriage and at right angles to said guide rail, a bar at right angles to the guide rail and guided by said rib, said bar having an upstanding lug, a stub shaft projecting from said lug, a pinion rotatably mounted on the stub shaft, a collar integral with said pinion and having a plurality of spaced notches, an arm pivotally connected to the stub shaft and adapted to engage one of said notches to prevent rotation of said pinion relative to the stub shaft, means to move and hold the arm from engagement with the collar, and means to adjustably support the guide rail and cause the pinion to engage the teeth of a flywheel of an automotive engine.

9. In a device for repairing automotive engines, an arcuate guide rail, a carriage slidably mounted along said guide rail, a rib projecting from said carriage and at right angles to said guide rail, a bar at right angles to the guide rail and guided by said rib, said bar having an upstanding lug, a stub shaft projecting from said lug, a pinion rotatably mounted on the stub shaft, a collar integral with said pinion and having a plurality of spaced notches, an arm pivotally connected to the stub shaft and adapted to engage one of said notches to prevent rotation of said pinion relative to the stub shaft, a rod connected to said arm, a compression spring associated with said rod and tending to normally move the rod to a position to cause the arm to engage a notch in said collar, and means to adjustably support the guide rail and cause the pinion to engage the teeth of a flywheel of an automotive engine.

10. In a device for repairing automotive engines, an arcuate guide rail, a carriage slidably mounted along said guide rail, a rib projecting from said carriage and at right angles to said guide rail, a bar at right angles to the guide rail and guided by said rib, said bar having an upstanding lug, a stub shaft projecting from said lug, a pinion rotatably mounted on the stub shaft, a collar integral with said pinion and having a plurality of spaced notches, an arm pivotally connected to the stub shaft and adapted to engage one of said notches to prevent rotation of said pinion relative to the stub shaft, a rod connected to said arm, a compression spring associated with said rod and tending to normally move the rod to a position to cause the arm to engage a notch in said collar, means to adjustably support the guide rail and cause the pinion to engage the teeth of a flywheel of an automotive engine, and a latch on said rod adapted to hold the rod in a position to prevent engagement of said arm with the notches in said collar.

11. In a device for repairing automotive engines, an arcuate guide rail, a carriage slidably mounted along said guide rail, a rib projecting from said carriage and at right angles to said guide rail, a bar at right angles to the guide rail and guided by said rib, said bar having an upstanding lug, a stub shaft projecting from said lug, a pinion rotatably mounted on the stub shaft, a collar integral with said pinion and having a plurality of spaced notches, an arm pivotally connected to the stub shaft and adapted to engage one of said notches to prevent rotation of said pinion relative to the stub shaft, a rod connected to said arm, a compression spring associated with said rod and tending to normally move the rod to a position to cause the arm to engage a notch in said collar, means to adjustably support the guide rail and cause the pinion to engage the teeth of a flywheel of an automotive engine, and a handle depending from the carriage to move the carriage along the guide rail.

12. In a device for repairing automotive engines, an arcuate guide rail, a carriage slidably mounted along said guide rail, a rib projecting from said carriage and at right angles to said guide rail, a bar at right angles to the guide rail and guided by said rib, said bar having an upstanding lug, a stub shaft projecting from said lug, a pinion rotatably mounted on the stub shaft, a collar integral with said pinion and having a plurality of spaced notches, an arm pivotally connected to the stub shaft and adapted to engage one of said notches to prevent rotation of said pinion relative to the stub shaft, a rod connected to said arm, a compression spring associated with said rod and tending to normally move the rod to a position to cause the arm to engage a notch in said collar, means to adjustably support the guide rail and cause the pinion to engage the teeth of a flywheel of an automotive engine, a latch on said rod adapted to hold the rod in a position to prevent engagement of said arm with the notches in said collar, and a handle depending from the carriage to move the carriage along the guide rail.

13. In a device for repairing automotive engines, a pair of members adapted to be secured to the underside of a crankcase, a guide rail supported by said members, a carriage slidably mounted on the guide rail, a bracket adjustably mounted on said carriage, a pinion carried by said bracket, means to prevent rotation of the pinion, and means to enable the carriage to be moved along the guide rail.

14. In a device for repairing automotive engines, a guide rail, members adjustably connected to said guide rail and adapted to be attached to the underside of a crank case, a carriage slidably mounted on the guide rail, a pinion supported by said carriage and adapted to engage the teeth of a flywheel of an automotive engine, means to prevent rotation of the pinion, and a handle depending from the carriage to move the carriage along the guide rail.

15. In a device for repairing automotive engines, an arcuate guide rail, a carriage movably mounted on said guide rail, means to support said guide rail, a pinion carried by said carriage, means to normally prevent rotation of said pinion, means to adjust the position of the pinion to cause the pinion to properly engage the teeth of a flywheel of an engine, means to move the carriage along the guide rail, and means to enable the pinion to rotate freely.

TONY DE BIASSE.